United States Patent
Solomentsev et al.

(10) Patent No.: US 12,498,489 B2
(45) Date of Patent: Dec. 16, 2025

(54) LiDAR SYSTEMS AND METHODS

(71) Applicant: YANDEX SELF DRIVING GROUP LLC, Moscow (RU)

(72) Inventors: Dmitry Valentinovich Solomentsev, Moscow (RU); Andrey Viktorovich Golikov, Moscow (RU); Nikolay Evgenevich Orlov, Sarapul (RU); Vladimir Albertovich Kuznetsov, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 1040 days.

(21) Appl. No.: 17/478,536

(22) Filed: Sep. 17, 2021

(65) Prior Publication Data
US 2022/0113428 A1    Apr. 14, 2022

(30) Foreign Application Priority Data
Oct. 9, 2020 (RU) .............. RU2020133317

(51) Int. Cl.
*G01S 17/93* (2020.01)
*G01S 7/481* (2006.01)
(Continued)

(52) U.S. Cl.
CPC .......... *G01S 17/931* (2020.01); *G01S 7/4817* (2013.01); *G02B 5/04* (2013.01); *G02B 5/09* (2013.01);
(Continued)

(58) Field of Classification Search
None
See application file for complete search history.

(56) References Cited

U.S. PATENT DOCUMENTS

| | | |
|---|---|---|
| 8,836,922 B1 | 9/2014 | Pennecot et al. |
| 2007/0201027 A1 | 8/2007 | Doushkina et al. |

(Continued)

FOREIGN PATENT DOCUMENTS

| | | |
|---|---|---|
| CN | 109254276 A | 1/2019 |
| DE | 102012102244 B4 | 2/2015 |

(Continued)

OTHER PUBLICATIONS

Abdelsalam et al. "Multi-segment tapered optical mirror for MEMS LiDAR application", Free-Space Laser Communication and Atmospheric Propagation XXIX, vol. 100960, Feb. 24, 2017, https://doi.org/10.1117/12.2251330.

(Continued)

*Primary Examiner* — Hovhannes Baghdasaryan
(74) *Attorney, Agent, or Firm* — BCF LLP

(57) ABSTRACT

A LIDAR system for detecting objects comprising: a radiation source for emitting output beams; a scanner for directing output beams onto a field of view (FOV), and a controller. The scanner comprises: a scanning face having reflective zones with reflective surfaces. Each reflective surface can receive the output beams and transmit as spread beams along a spread axis to define a region of interest (ROI) within the FOV. At least two different reflective surfaces can generate different ROIs with different spread axes. The controller is configured to cause relative movement between the output beams and the scanner for selective contact of the output beams with a given reflective zone to emit a given output beam as a desired region of interest.

19 Claims, 7 Drawing Sheets

(51) Int. Cl.
    *G01S 17/931* (2020.01)
    *G02B 5/04* (2006.01)
    *G02B 5/09* (2006.01)
    *G02B 7/182* (2021.01)
    *G02B 26/10* (2006.01)
    *G02B 26/12* (2006.01)
    *G02B 27/14* (2006.01)

(52) U.S. Cl.
    CPC ......... *G02B 7/1821* (2013.01); *G02B 26/105* (2013.01); *G02B 26/129* (2013.01); *G02B 27/143* (2013.01)

(56) References Cited

U.S. PATENT DOCUMENTS

| | | |
|---|---|---|
| 2011/0255070 A1 | 10/2011 | Phillips et al. |
| 2012/0249996 A1 | 10/2012 | Tanaka et al. |
| 2013/0033732 A1 | 2/2013 | Davis et al. |
| 2015/0301182 A1 | 10/2015 | Geiger et al. |
| 2017/0307876 A1 | 10/2017 | Dussan et al. |
| 2018/0329037 A1 | 11/2018 | Bozchalooi et al. |
| 2019/0011257 A1 | 1/2019 | Schwendener et al. |
| 2019/0101627 A1 | 4/2019 | Hansson et al. |
| 2019/0154802 A1 | 5/2019 | Campbell et al. |
| 2019/0154804 A1 | 5/2019 | Eichenholz |
| 2019/0162947 A1* | 5/2019 | Low ................. G02B 5/09 |
| 2019/0195992 A1 | 6/2019 | Nabbe |
| 2019/0265338 A1 | 8/2019 | Lin et al. |
| 2019/0310351 A1 | 10/2019 | Hughes et al. |
| 2020/0025881 A1 | 1/2020 | Li et al. |
| 2020/0025889 A1 | 1/2020 | Kim et al. |
| 2020/0049819 A1 | 2/2020 | Cho et al. |
| 2020/0064623 A1 | 2/2020 | Ain-Kedem et al. |
| 2020/0132851 A1 | 4/2020 | Gassend et al. |
| 2020/0150247 A1 | 5/2020 | Ledbetter et al. |
| 2020/0319304 A1 | 10/2020 | Pan |

FOREIGN PATENT DOCUMENTS

| | | |
|---|---|---|
| JP | 6340851 B2 | 6/2018 |
| KR | 20160078043 A | 7/2016 |
| RU | 2655040 C1 | 5/2018 |
| WO | 2018209073 A1 | 11/2018 |
| WO | 2020092120 A1 | 5/2020 |

OTHER PUBLICATIONS

U.S. Appl. No. 17/329,255, filed May 25, 2021.

LAMDA "Large aperture MEMS scanner module for 3D distance measurement", Fraunhofer Institute for photonic microsystems IPMS, Maria-Reiche-Str. 201109 Dresden, 2009.

Sabry et al. "Integrated wide-angle scanner based on translating a curved mirror of a cylindrical shape", Optics express Dec. 21, 2013, vol. 21, Issue 12, : 13906-13916. pp. 13906-13916, 2013, https://doi.org/10.1364/OE.21.013906.

Sabry et al. "Curved Silicon Micromirror for Linear Displacement-to-Angle Conversion With Uniform Spot Size", Published in: IEEE Journal of Selected Topics in Quantum Electronics, vol. 21, Issue 4, Jul.-Aug. 2015, Doi: 10.1109/JSTQE.2014.2375493.

Guo et al. "Analysis and Calculation of Scan Trace of Laser Scanning Rotation Mirror", Published on Apr. 2011, doi:10.3788/CJL201138.0408003.

European Search Report dated Mar. 2, 2022 issued in respect of the European Patent Application No. 21198079.2.

European Search Report dated Mar. 7, 2022 issued in respect of the European Patent Application No. 21198076.8.

Russian Search Report dated Oct. 28, 2022 issued in respect of the counterpart Russian Patent Application No. RU 2020133318.

Russian Search Report dated Oct. 14, 2022 issued in respect of the counterpart Russian Patent Application No. RU 2020133316.

\* cited by examiner

LiDAR SYSTEMS AND METHODS

CROSS-REFERENCE

The present application claims priority to Russian Patent Application No. 2020133317, entitled "Lidar Systems and Methods", filed Oct. 9, 2020, the entirety of which is incorporated herein by reference.

TECHNICAL FIELD

The present technology relates generally to Light Detection and Ranging (LiDAR) systems and methods for detecting objects in a surrounding environment of an autonomous vehicle; and in particular, to LiDAR systems and methods for detecting objects in a desired region of interest in the surrounding environment.

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control systems implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems, upon detection of the vehicle (or other obstacles) in front of the moving vehicle, slow down or stop the vehicle.

Some of the more advanced systems provide for a fully autonomous driving of the vehicle without direct control from the operator (i.e. the driver). These autonomously driven vehicles include systems that can cause the vehicle to accelerate, brake, stop, change lane and self-park.

One of the main technical challenges in implementing the above systems is the ability to detect objects located around the vehicle. In one example, the systems may need the ability to detect the vehicle in front of the present vehicle (the present vehicle having the system onboard), which vehicle in front may pose a risk/danger to the present vehicle and may require the system to take a corrective measure, be it braking or otherwise changing speed, stopping or changing lanes. In another example, the systems may need to detect a pedestrian or animal crossing in front of the vehicle or otherwise in a surrounding environment of the vehicle.

LiDAR-based object detection generally comprises transmitting beams of light towards a region of interest, and detecting reflected light beams, such as from objects in the region of interest, to generate a representation of the region of interest including any objects. Lasers emitting pulses of light within a narrow wavelength are often used as the radiation (light) source. The position and distance of the object can be computed using inter alia Time of Flight calculations of the emitted and detected light beam. By computing such positions as "data points", a digital multi-dimensional representation of the surroundings can be generated.

Generally, as for the physics of LiDAR-based object detection, one approach currently known in the art is based on utilizing a pulsed emission and is referred to as Time of Flight (ToF) LiDAR systems. In ToF LiDAR systems, each LiDAR sensor emits a short pulse of a predetermined wavelength and further registers time that it takes for the pulse to scatter from a surrounding object and to return to the respective LiDAR sensor. By rotating the ToF LiDAR system, positioned at the top of the vehicle, comprising a plurality of such LiDAR sensors, by 360 degrees, a 3D representation of the surroundings of the vehicle can be generated.

The 3D representation is formed in part by reflected beams received by the LIDAR which generates data points representative of the surrounding objects. These points form clouds that represent the surrounding environment and form a 3D map. Each point in the point cloud is associated with coordinates in a coordinate space. Additionally, each point can be associated with some additional information such as the distance to the object from the self-driving vehicle. Other information may be associated with the points in the point cloud.

The more points with acceptable quality are obtained, the better. In this case, a computer of the self-driving vehicle can perform tasks of various cognitive complexity using the point cloud, e.g. filtering, clustering or sampling of the points, merging of the point clouds, recognizing the object, etc. The quality of performing these separate tasks affects the general quality of localization and navigation of the self-driving vehicle. Precise information on the surrounding objects improves the safety of driving.

Under certain circumstances there may be a need to detect objects within different regions of interest relative to the vehicle. An ability to quickly and efficiently switch between the different regions of interest would be advantageous.

SUMMARY

Therefore, there is a need for systems and methods which avoid, reduce or overcome the limitations of the prior art.

In order to address the above-identified problem, certain prior art approaches have been proposed.

United States Patent Application Publication US2019162947A describes an example MEMS device which includes a base and a plurality of mirror surfaces supported on the base. The plurality of mirror surfaces is respectively in a fixed position relative to the base. The plurality of mirror surfaces is at respective angles relative to a reference. The respective angles of at least some of the mirror surfaces are different from the respective angles of at least some others of the mirror surfaces.

United States Patent Application Publication US2020049819 describes an optical scanner includes at least one light source configured to emit light, a steering unit configured to perform scanning in a first direction based on the light emitted from the at least one light source, and a polygon mirror configured to perform, by using the light output from the steering unit, scanning in a second direction different than the first direction based on a rotation of the polygon mirror. The steering unit includes a plurality of first prisms, and each of the plurality of first prisms includes an incident facet configured to pass the light emitted from the at least one light source, and an output facet configured to refract and output the light. The polygon mirror includes a plurality of reflective facets, and each of the plurality of reflective facets is configured to that reflect the light output from the steering unit.

United States Patent Application Publication US2020150247A describes LiDAR systems that use a rotating polygon with a multi-facet mirror. Such multi-facet galvanometer mirror arrangements generate a point map that has reduced curvature.

In accordance with a first broad aspect of the present technology, there is provided a LIDAR system for detecting objects in a surrounding environment of an autonomous vehicle, the LIDAR system comprising: a radiation source configured to emit output beams along an internal emission pathway; a scanner positionable along the internal emission pathway and configured to direct the output beams onto a field of view (FOV) within the surrounding environment, wherein the scanner comprises: a scanning face having a plurality of reflective zones with respective reflective surfaces, the plurality of reflective zones comprising at least: a first zone having a first reflective surface for receiving at least a portion of the output beams and transmitting as a first spread beam along a first spread axis to define a first region of interest (ROI) within the FOV, and a second zone having second reflective surface for receiving at least a portion of the output beams and transmitting as a second spread beam along a second spread axis to define a second ROI within the FOV, the first spread axis being different than the second spread axis; and a controller communicatively coupled to the radiation source and the scanner, the controller being configured to cause relative movement between the output beams and the scanner for selective contact of the output beams with a given reflective zone of the plurality of reflective zones to emit a given output beam as a desired region of interest.

In certain embodiments, the controller is configured to move the scanner in a direction parallel to an elongate plane of the scanning body for selective contact of the output beams with the given reflective zone of the plurality of reflective zones.

In certain embodiments, the controller is configured to move the output beams for selective contact of the output beams with the given reflective zone of the plurality of reflective zones.

In certain embodiments, the controller is configured to cause the scanner to selectively oscillate about different axes of oscillation in order to cause selective contact of the output beams with different reflective zones of the plurality of reflective zones.

In certain embodiments, the scanner is an oscillating mirror and configured to oscillate about an axis of oscillation.

In certain embodiments, the controller is configured to modulate an amplitude of the oscillation of the oscillating mirror.

In certain embodiments, the scanner is an oscillating mirror and configured to selectively oscillate about different axes of oscillation, the different axes of oscillation comprising at least: a first axis of oscillation which has a first position relative to the first reflective surface and a second axis of oscillation which has a second position relative to the second reflective surface.

In certain embodiments, the first position is centered with respect to the first reflective surface.

In certain embodiments, the controller is configured to maintain an oscillation of the oscillating mirror while causing the oscillating mirror to oscillate about different axes of oscillation.

In certain embodiments, the scanning face is non-planar, and the first reflective surface and the second reflective surface are angularly off-set from one another.

In certain embodiments, the first reflective surface and the second reflective surface are made of different materials to impart different optical properties on the first spread beam and the second spread beam.

In certain embodiments, the scanner is a rotating prism having a plurality of faces, and at least one of the faces of the rotating prism comprising the scanning face having the plurality of reflective zones with respective reflective surfaces.

In certain embodiments, at least one of the reflective surfaces includes a material configured to modulate an optical property of the output beam incident on the at least one reflective surface.

In certain embodiments, the scanner is an oscillating galvo mirror having at least one face, and the at least one face of the oscillating galvo mirror comprises the scanning face having the plurality of reflective zones with respective reflective surfaces.

In certain embodiments, the LIDAR system further comprises a receiver for receiving reflected output beams from the region of interest.

In accordance with a second broad aspect of the present technology, there is provided method for detecting objects in a surrounding environment of an autonomous vehicle, the method executable by a controller which is communicatively coupled to a radiation source and a scanner of a LIDAR system, the method comprising: causing the radiation source to emit output beams along an internal emission pathway of the LIDAR system; causing the scanner to direct the output beams onto a field of view (FOV) within the surrounding environment, the scanner comprising: a scanning face having a plurality of reflective zones with respective reflective surfaces, the plurality of reflective zones comprising at least: a first zone having a first reflective surface for receiving at least a portion of the output beams and transmitting as a first spread beam along a first spread axis to define a first region of interest (ROI) within the FOV, and a second zone having second reflective surface for receiving at least a portion of the output beams and transmitting as a second spread beam along a second spread axis to define a second ROI within the FOV, the first spread axis being different than the second spread axis; and wherein the directing the output beams onto the FOV comprises causing relative movement between the output beams and the scanner for selective contact of the output beams with a given reflective zone of the plurality of reflective zones to emit a given output beam as a desired region of interest.

In certain embodiments, the controller is configured to cause relative movement between the output beams and the scanner for selective contact of the output beams with a given reflective zone of the plurality of reflective zones according to one or more of (a) a predetermined schedule, (b) responsive to a determination from a sensor signal that a scan of a given region of interest within the FOV is required, (c) responsive to a geographical trigger, and (d) responsive to an environmental trigger.

In certain embodiments, the causing the relative movement comprises the controller causing the scanner to move in a direction to parallel to an elongate plane of the scanner.

In certain embodiments, the causing the relative movement comprises the controller causing a direction of travel of the output beam to change.

In certain embodiments, the causing the relative movement comprises causing the scanner to selectively oscillate about different axes of oscillation, whilst modulating an amplitude of the oscillation.

In the context of the present specification, the term "light source" broadly refers to any device configured to emit radiation such as a radiation signal in the form of a beam, for example, without limitation, a light beam including radiation of one or more respective wavelengths within the electromagnetic spectrum. In one example, the light source can be a "laser source". Thus, the light source could include a laser such as a solid-state laser, laser diode, a high power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser source may emit light beams in differing formats, such as light pulses, continuous wave (CW), quasi-CW, and so on. In some non-limiting examples, the laser source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm, or in between any other suitable range. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest. The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected from one or more objects in the ROI. The "input beam" may also be referred to as a radiation beam or light beam. By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" or "environment" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LiDAR system in which the one or more objects may be detected. It is noted that the region of interest of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LIDAR system may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
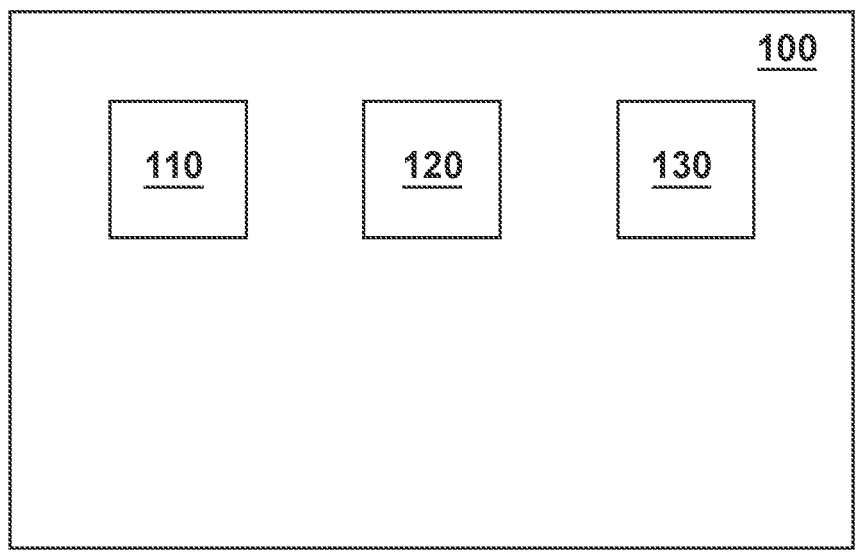
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a schematic diagram of a computer system 100 suitable for use with some implementations of the present technology. The computer system 100 includes various hardware components including one or more single or multi-core processors collectively represented by a processor 110, a solid-state drive 120, and a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computing Environment

Figure 2:
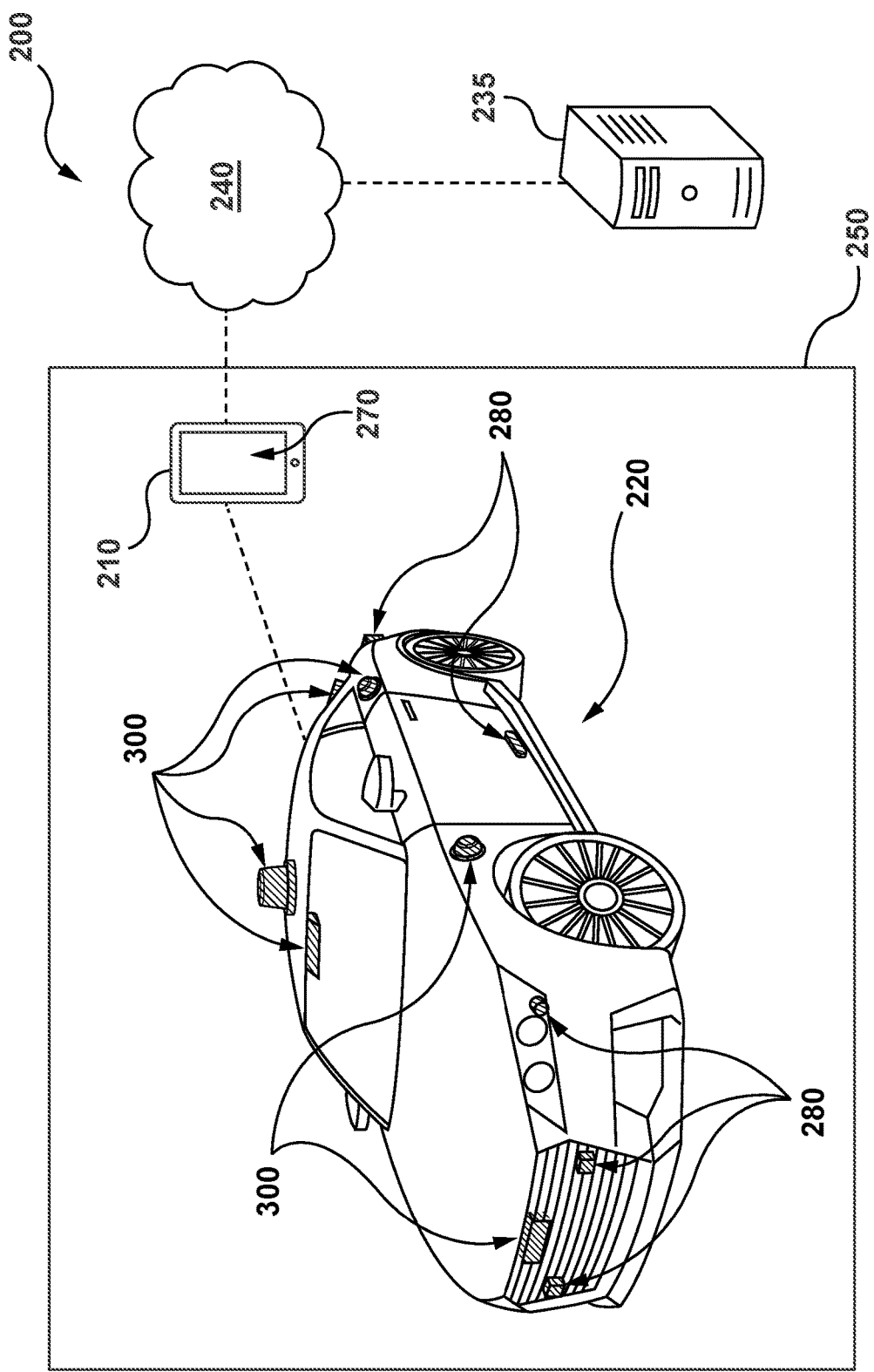
FIG. 2 depicts a schematic diagram of a networked computing environment being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The networked computing environment 200 also includes a server 235 in communication with the electronic device 210 via a communication network 240 (e.g. the Internet or the like, as will be described in greater detail herein below).

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not shown).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

It should be noted that the plurality of sensor systems 280 could include additional types of sensor systems to those non-exhaustively described above and without departing from the scope of the present technology.

LiDAR System

According to the present technology and as is illustrated in FIG. 2, the vehicle 220 is equipped with at least one Light Detection and Ranging (LiDAR) system, such as a LiDAR system 300, for gathering information about surroundings 250 of the vehicle 220. While only described herein in the context of being attached to the vehicle 220, it is also contemplated that the LiDAR system 300 could be a stand alone operation or connected to another system.

Depending on the embodiment, the vehicle 220 could include more or fewer LiDAR systems 300 than illustrated. Depending on the particular embodiment, choice of inclusion of particular ones of the plurality of sensor systems 280 could depend on the particular embodiment of the LiDAR system 300. The LiDAR system 300 could be mounted, or retrofitted, to the vehicle 220 in a variety of locations and/or in a variety of configurations.

For example, depending on the implementation of the vehicle 220 and the LiDAR system 300, the LiDAR system 300 could be mounted on an interior, upper portion of a windshield of the vehicle 220. Nevertheless, as illustrated in FIG. 2, other locations for mounting the LiDAR system 300 are within the scope of the present disclosure, including on a back window, side windows, front hood, rooftop, front grill, front bumper or the side of the vehicle 220. In some cases, the LiDAR system 300 can even be mounted in a dedicated enclosure mounted on the top of the vehicle 220.

In some non-limiting embodiments, such as that of FIG. 2, a given one of the plurality of LiDAR systems 300 is mounted to the rooftop of the vehicle 220 in a rotatable configuration.

For example, the LiDAR system 300 mounted to the vehicle 220 in a rotatable configuration could include at least some components that are rotatable 360 degrees about an axis of rotation of the given LiDAR system 300. When mounted in rotatable configurations, the given LiDAR system 300 could gather data about most of the portions of the surroundings 250 of the vehicle 220.

In some non-limiting embodiments of the present technology, such as that of FIG. 2, the LiDAR systems 300 is mounted to the side, or the front grill, for example, in a non-rotatable configuration. For example, the LiDAR system 300 mounted to the vehicle 220 in a non-rotatable configuration could include at least some components that are not rotatable 360 degrees and are configured to gather data about pre-determined portions of the surroundings 250 of the vehicle 220.

Irrespective of the specific location and/or the specific configuration of the LiDAR system 300, it is configured to capture data about the surroundings 250 of the vehicle 220 used, for example, for building a multi-dimensional map of objects in the surroundings 250 of the vehicle 220. Details relating to the configuration of the LiDAR systems 300 to capture the data about the surroundings 250 of the vehicle 220 will now be described.

It should be noted that although in the description provided herein the LiDAR system 300 is implemented as a Time of Flight LiDAR system—and as such, includes respective components suitable for such implementation thereof—other implementations of the LiDAR system 300 are also possible without departing from the scope of the present technology. For example, in certain non-limiting embodiments of the present technology, the LiDAR system 300 may also be implemented as a Frequency-Modulated Continuous Wave (FMCW) LiDAR system according to one or more implementation variants and based on respective components thereof as disclosed in a co-owned U.S. patent application filed on May 25, 2021 bearing Ser. No. 17/329, 255 entitled "LiDAR DETECTION METHODS AND SYSTEMS"; the content of which is hereby incorporated by reference in its entirety.

Figure 3:
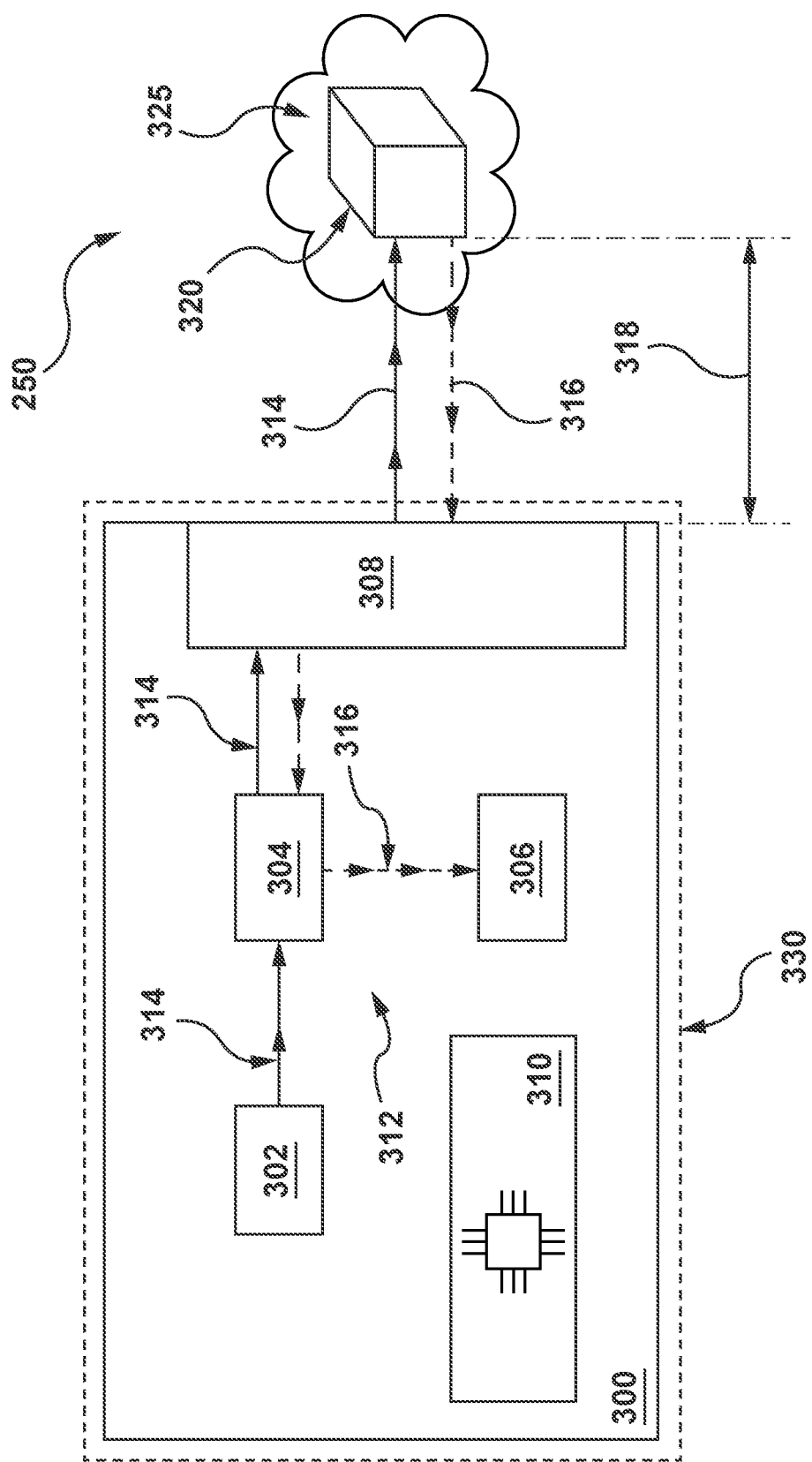
FIG. 3 depicts a schematic diagram of an example LiDAR system implemented in accordance with certain non-limiting embodiments of the present technology.

With reference to FIG. 3, there is depicted a schematic diagram of one particular embodiment of the LiDAR system 300 implemented in accordance with certain non-limiting embodiments of the present technology.

Broadly speaking, the LiDAR system 300 includes a variety of internal components including, but not limited to: (i) a light source 302 (also referred to as a "laser source" or a "radiation source"), (ii) a beam splitting element 304, (iii) a scanner unit 308 (also referred to as a "scanner assembly"), (iv) a receiving unit 306 (also referred to herein as a "detection system", "receiving assembly", or a "detector"), and (v) a controller 310. It is contemplated that in addition to the components non-exhaustively listed above, the LiDAR system 300 could include a variety of sensors (such as, for example, a temperature sensor, a moisture sensor, etc.) which are omitted from FIG. 3 for sake of clarity.

In certain non-limiting embodiments of the present technology, one or more of the internal components of the LiDAR system 300 are disposed in a common housing 330 as depicted in FIG. 3. In some embodiments of the present technology, the controller 310 could be located outside of the common housing 330 and communicatively connected to the components therein.

Generally speaking, the LiDAR system 300 operates as follows: the light source 302 of the LiDAR system 300 emits pulses of light, forming an output beam 314; the scanner unit 308 scans the output beam 314 across the surroundings 250 of the vehicle 220 for locating/capturing data of a priori unknown objects (such as an object 320) therein, for example, for generating a multi-dimensional map of the surroundings 250 where objects (including the object 320) are represented in a form of one or more data points. The light source 302 and the scanner unit 308 will be described in more detail below.

As certain non-limiting examples, the object 320 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Further, let it be assumed that the object 320 is located at a distance 318 from the LiDAR system 300. Once the output beam 314 reaches the object 320, the object 320 generally reflects at least a portion of light from the output beam 314, and some of the reflected light beams may return back towards the LiDAR system 300, to be received in the form of an input beam 316. By reflecting, it is meant that at least a portion of light beam from the output beam 314 bounces off the object 320. A portion of the light beam from the output beam 314 may be absorbed or scattered by the object 320.

Accordingly, the input beam 316 is captured and detected by the LiDAR system 300 via the receiving unit 306. In response, the receiving unit 306 is then configured to generate one or more representative data signals. For example, the receiving unit 306 may generate an output electrical signal (not depicted) that is representative of the input beam 316. The receiving unit 306 may also provide the so-generated electrical signal to the controller 310 for further processing. Finally, by measuring a time between emitting the output beam 314 and receiving the input beam 316 the distance 318 to the object 320 is calculated by the controller 310.

As will be described in more detail below, the beam splitting element 304 is utilized for directing the output beam 314 from the light source 302 to the scanner unit 308 and for directing the input beam 316 from the scanner unit to the receiving unit 306.

Use and implementations of these components of the LiDAR system 300, in accordance with certain non-limiting embodiments of the present technology, will be described immediately below.

Light Source

The light source 302 is communicatively coupled to the controller 310 and is configured to emit light having a given operating wavelength. To that end, in certain non-limiting embodiments of the present technology, the light source 302 could include at least one laser pre-configured for operation at the given operating wavelength. The given operating wavelength of the light source 302 may be in the infrared, visible, and/or ultraviolet portions of the electromagnetic spectrum. For example, the light source 302 may include at least one laser with an operating wavelength between about 650 nm and 1150 nm. Alternatively, the light source 302 may include a laser diode configured to emit light at a wavelength between about 800 nm and about 1000 nm, between about 850 nm and about 950 nm, or between about 1300 nm and about 1600 nm. In certain other embodiments, the light source 302 could include a light emitting diode (LED).

The light source 302 of the LiDAR system 300 is generally an eye-safe laser, or put another way, the LiDAR system 300 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

According to certain non-limiting embodiments of the present technology, the operating wavelength of the light source 302 may lie within portions of the electromagnetic spectrum that correspond to light produced by the Sun. Therefore, in some cases, sunlight may act as background noise, which can obscure the light signal detected by the LiDAR system 300. This solar background noise can result in false-positive detections and/or may otherwise corrupt measurements of the LiDAR system 300. Although it may be feasible in some cases to increase a Signal-to-Noise Ratio (SNR) of the LiDAR system 300 by increasing the power level of the output beam 314, this may not be desirable in at least some situations. For example, it may not in some implementations be desirable to increase power levels of the output beam 314 to levels beyond eye-safe thresholds.

The light source 302 includes a pulsed laser configured to produce, emit, or radiate pulses of light with a certain pulse duration. For example, in some non-limiting embodiments of the present technology, the light source 302 may be configured to emit pulses with a pulse duration (e.g., pulse width) ranging from 10 ps to 100 ns. In other non-limiting embodiments of the present technology, the light source 302 may be configured to emit pulses at a pulse repetition frequency of approximately 100 kHz to 5 MHz or a pulse period (e.g., a time between consecutive pulses) of approximately 200 ns to 10 µs. Overall, however, the light source 302 can generate the output beam 314 with any suitable average optical power, and the output beam 314 may include optical pulses with any suitable pulse energy or peak optical power for a given application.

In some non-limiting embodiments of the present technology, the light source 302 could include one or more laser diodes, including but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light source 302 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the light source 302 may include one or more laser diodes that are current-modulated to produce optical pulses.

In some non-limiting embodiments of the present technology, the light source 302 is generally configured to emit the output beam 314 that is a collimated optical beam, but it is contemplated that the beam produced could have any suitable beam divergence for a given application. Broadly speaking, divergence of the output beam 314 is an angular measure of an increase in beam cross-section size (e.g., a beam radius or beam diameter) as the output beam 314 travels away from the light source 302 or the LiDAR system 300. In some non-limiting embodiments of the present technology, the output beam 314 may have a substantially circular cross-section.

It is also contemplated that the output beam 314 emitted by light source 302 could be unpolarized or randomly polarized, could have no specific or fixed polarization (e.g., the polarization may vary with time), or could have a particular polarization (e.g., the output beam 314 may be linearly polarized, elliptically polarized, or circularly polarized).

In at least some non-limiting embodiments of the present technology, the output beam 314 and the input beam 316 may be substantially coaxial. In other words, the output beam 314 and input beam 316 may at least partially overlap or share a common propagation axis, so that the input beam 316 and the output beam 314 travel along substantially the same optical path (albeit in opposite directions). Nevertheless, in other non-limiting embodiments of the present technology, the output beam 314 and the input beam 316 may not be coaxial, or in other words, may not overlap or share a common propagation axis inside the LiDAR system 300, without departing from the scope of the present technology.

It should be noted that in at least some non-limiting embodiments of the present technology, the light source 302 could be rotatable, such as by 360 degrees or less, about the axis of rotation (not depicted) of the LiDAR system 300 when the LiDAR system 300 is implemented in a rotatable configuration. However, in other embodiments, the light source 302 may be stationary even when the LiDAR system 300 is implemented in a rotatable configuration, without departing from the scope of the present technology.

Beam Splitting Element

With continued reference to FIG. 3, there is further provided the beam splitting element 304 disposed in the housing 330. For example, as previously mentioned, the beam splitting element 304 is configured to direct the output beam 314 from the light source 302 towards the scanner unit 308. The beam splitting element 304 is also arranged and configured to direct the input beam 316 reflected off the object 320 to the receiving unit 306 for further processing thereof by the controller 310.

However, in accordance with other non-limiting embodiments of the present technology, the beam splitting element 304 may be configured to split the output beam 314 into at least two components of lesser intensity including a scanning beam (not separately depicted) used for scanning the surroundings 250 of the LiDAR system 300, and a reference beam (not separately depicted), which is further directed to the receiving unit 306.

In other words, in these embodiments, the beam splitting element 304 can be said to be configured to divide intensity (optical power) of the output beam 314 between the scanning beam and the reference beam. In some non-limiting embodiments of the present technology, the beam splitting element 304 may be configured to divide the intensity of the output beam 314 between the scanning beam and the reference beam equally. However, in other non-limiting embodiments of the present technology, the beam splitting element 304 may be configured to divide the intensity of the output beam 314 at any predetermined splitting ratio. For example, the beam splitting element 304 may be configured to use up to 80% of the intensity of the output beam 314 for forming the scanning beam, and the remainder of up to 20% of the intensity of the output beam 314—for forming the reference beam. In yet other non-limited embodiments of the present technology, the beam splitting element 304 may be configured to vary the splitting ratio for forming the scanning beam (for example, from 1% to 95% of the intensity of the output beam 314).

It should further be noted that some portion (for example, up to 10%) of the intensity of the output beam 314 may be absorbed by a material of the beam splitting element 304, which depends on a particular configuration thereof.

Depending on the implementation of the LiDAR system 300, the beam splitting element 304 could be provided in a variety of forms, including but not limited to: a glass prism-based beam splitter component, a half-silver mirror-based beam splitter component, a dichroic mirror prism-based beam splitter component, a fiber-optic-based beam splitter component, and the like.

Thus, according to the non-limiting embodiments of the present technology, a non-exhaustive list of adjustable parameters associated with the beam splitting element 304, based on a specific application thereof, may include, for example, an operating wavelength range, which may vary from a finite number of wavelengths to a broader light spectrum (from 1200 to 1600 nm, as an example); an income incidence angle; polarizing/non-polarizing, and the like.

In a specific non-limiting example, the beam splitting element 304 can be implemented as a fiber-optic-based beam splitter component that may be of a type available from OZ Optics Ltd. of 219 Westbrook Rd Ottawa, Ontario KOA 1L0 Canada. It should be expressly understood that the beam splitting element 304 can be implemented in any other suitable equipment.

Internal Beam Paths

As is schematically depicted in FIG. 3, the LiDAR system 300 forms a plurality of internal beam paths 312 along which the output beam 314 (generated by the light source 302) and the input beam 316 (received from the surroundings 250). Specifically, light propagates along the internal beam paths 312 as follows: the light from the light source 302 passes through the beam splitting element 304, to the scanner unit 308 and, in turn, the scanner unit 308 directs the output beam 314 outward towards the surroundings 250.

Similarly, the input beam 316 follows the plurality of internal beam paths 312 to the receiving unit 306. Specifically, the input beam 316 is directed by the scanner unit 308 into the LiDAR system 300 through the beam splitting element 304, toward the receiving unit 306. In some implementations, the LiDAR system 300 could be arranged with beam paths that direct the input beam 316 directly from the surroundings 250 to the receiving unit 306 (without the input beam 316 passing through the scanner unit 308).

It should be noted that, in various non-limiting embodiments of the present technology, the plurality of internal beam paths 312 may include a variety of optical components. For example, the LiDAR system 300 may include one or more optical components configured to condition, shape, filter, modify, steer, or direct the output beam 314 and/or the input beam 316. For example, the LiDAR system 300 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

It is contemplated that in at least some non-limiting embodiments of the present technology, the given internal beam path and the other internal beam path from the plurality of internal beam paths 312 may share at least some common optical components, however, this might not be the case in each and every embodiment of the present technology.

Scanner Unit

Generally speaking, the scanner unit 308 steers the output beam 314 in one or more directions downrange towards the surroundings 250. The scanner unit 308 is communicatively coupled to the controller 310. As such, the controller 310 is configured to control the scanner unit 308 so as to guide the output beam 314 in a desired direction downrange and/or along a predetermined scan pattern. Broadly speaking, in the context of the present specification "scan pattern" may refer to a pattern or path along which the output beam 314 is directed by the scanner unit 308 during operation.

In certain non-limiting embodiments of the present technology, the controller 310 is configured to cause the scanner unit 308 to scan the output beam 314 over a variety of horizontal angular ranges and/or vertical angular ranges; the total angular extent over which the scanner unit 308 scans the output beam 314 is referred to herein as the field of view (FoV). It is contemplated that the particular arrangement, orientation, and/or angular ranges could depend on the particular implementation of the LiDAR system 300. The field of view generally includes a plurality of regions of interest (ROIs), defined as portions of the FoV which may contain, for instance, objects of interest. In some implementations, the scanner unit 308 can be configured to further investigate a selected region of interest (ROI) 325. The ROI 325 of the LiDAR system 300 may refer to an area, a volume, a region, an angular range, and/or portion(s) of the surroundings 250 about which the LiDAR system 300 may be configured to scan and/or can capture data.

It should be noted that a location of the object 320 in the surroundings 250 of the vehicle 220 may be overlapped, encompassed, or enclosed at least partially within the ROI 325 of the LiDAR system 300.

According to certain non-limiting embodiments of the present technology, the scanner unit 308 may be configured to scan the output beam 314 horizontally and/or vertically, and as such, the ROI 325 of the LiDAR system 300 may have a horizontal direction and a vertical direction. For example, the ROI 325 may be defined by 45 degrees in the horizontal direction, and by 45 degrees in the vertical direction. In some implementations, different scanning axes could have different orientations.

In certain embodiments, the scanner unit 308 includes a mirror 309 which is coupled with a galvanometer (not separately depicted; also referred to herein as galvo mirror) providing control thereto. Accordingly, the controller 310 causes, via the galvanometer, rotation of the mirror about a perpendicular axis associated therewith, thereby scanning the ROI 325 according to the predetermined scan pattern.

In certain non-limiting embodiments of the present technology, the scanner unit 308 may further include a variety of other optical components and/or mechanical-type components for performing the scanning of the output beam 314. For example, the scanner unit 308 may include one or more mirrors, prisms, lenses, MEM components, piezoelectric components, optical fibers, splitters, diffractive elements, collimating elements, and the like. It should be noted that the scanner unit 308 may also include one or more additional actuators (not separately depicted) driving at least some of the other optical components to rotate, tilt, pivot, or move in an angular manner about one or more axes, for example.

The LiDAR system 300 may thus make use of the predetermined scan pattern to generate a point cloud substantially covering the ROI 325 of the LiDAR system 300. As will be described in greater detail herein further below, this point cloud of the LiDAR system 300 may be used to render a multi-dimensional map of objects in the surroundings 250 of the vehicle 220.

As will become apparent from the description provided herein below, in certain non-limiting embodiments of the present technology, a scanning face of the mirror may be configured to be associated with a respective scanning frequency.

Receiving Unit

According to certain non-limiting embodiments of the present technology, the receiving unit 306 is communicatively coupled to the controller 310 and may be implemented in a variety of ways. According to the present technology, the receiving unit 306 includes a photodetector, but could include (but is not limited to) a photoreceiver, optical receiver, optical sensor, detector, optical detector, optical fibers, and the like. As mentioned above, in some non-limiting embodiments of the present technology, the receiving unit 306 may be configured to acquire or detects at least a portion of the input beam 316 and produces an electrical signal that corresponds to the input beam 316. For example, if the input beam 316 includes an optical pulse, the receiving unit 306 may produce an electrical current or voltage pulse that corresponds to the optical pulse detected by the receiving unit 306.

It is contemplated that, in various non-limiting embodiments of the present technology, the receiving unit 306 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the receiving unit 306 may also include circuitry that performs signal amplification, sampling, filtering, signal conditioning, analog-to-digital conversion, time-to-digital conversion, pulse detection, threshold detection, rising-edge detection, falling-edge detection, and the like. For example, the receiving unit 306 may include electronic components configured to convert a received photocurrent (e.g., a current produced by an APD in response to a received optical signal) into a voltage signal. The receiving unit 306 may also include additional circuitry for producing an analog or digital output signal that corresponds to one or more characteristics (e.g., rising edge, falling edge, amplitude, duration, and the like) of a received optical pulse.

Controller

Depending on the implementation, the controller 310 may include one or more processors, an application-specific integrated circuit (ASIC), a field-programmable gate array (FPGA), and/or other suitable circuitry. The controller 310 may also include non-transitory computer-readable memory to store instructions executable by the controller 310 as well as data which the controller 310 may produce based on the signals acquired from other internal components of the LiDAR system 300 and/or may provide signals to the other internal components of the LiDAR system 300. The memory can include volatile (e.g., RAM) and/or non-volatile (e.g., flash memory, a hard disk) components. The controller 310 may be configured to generate data during operation and store it in the memory. For example, this data generated by the controller 310 may be indicative of the data points in the point cloud of the LiDAR system 300.

It is contemplated that, in at least some non-limiting embodiments of the present technology, the controller 310 could be implemented in a manner similar to that of implementing the electronic device 210 and/or the computer system 100, without departing from the scope of the present technology. In addition to collecting data from the receiving unit 306, the controller 310 could also be configured to provide control signals to, and potentially receive diagnostics data from, the light source 302 and the scanner unit 308.

As previously stated, the controller 310 is communicatively coupled to the light source 302, the scanner unit 308, and the receiving unit 306. In some non-limiting embodiments of the present technology, the controller 310 may be configured to receive electrical trigger pulses from the light source 302, where each electrical trigger pulse corresponds to the emission of an optical pulse by the light source 302. The controller 310 may further provide instructions, a control signal, and/or a trigger signal to the light source 302 indicating when the light source 302 is to produce optical pulses indicative, for example, of the output beam 314.

Just as an example, the controller 310 may be configured to send an electrical trigger signal that includes electrical pulses, so that the light source 302 emits an optical pulse, representable by the output beam 314, in response to each electrical pulse of the electrical trigger signal. It is also contemplated that the controller 310 may cause the light source 302 to adjust one or more characteristics of output beam 314 produced by the light source 302 such as, but not limited to: frequency, period, duration, pulse energy, peak power, average power, and wavelength of the optical pulses.

By the present technology, the controller 310 is configured to determine a "time-of-flight" value for an optical pulse in order to determine the distance between the LiDAR system 300 and one or more objects in the field of view, as will be described further below. The time of flight is based on timing information associated with (i) a first moment in time when a given optical pulse (for example, of the output beam 314) was emitted by the light source 302, and (ii) a second moment in time when a portion of the given optical pulse (for example, from the input beam 316) was detected or received by the receiving unit 306. In some non-limiting embodiments of the present technology, the first moment may be indicative of a moment in time when the controller 310 emits a respective electrical pulse associated with the given optical pulse; and the second moment in time may be indicative of a moment in time when the controller 310 receives, from the receiving unit 306, an electrical signal generated in response to receiving the portion of the given optical pulse from the input beam 316.

In other non-limiting embodiments of the present technology, where the beam splitting element 304 is configured to split the output beam 314 into the scanning beam (not depicted) and the reference beam (not depicted), the first moment in time may be a moment in time of receiving, from the receiving unit 306, a first electrical signal generated in response to receiving a portion of the reference beam. Accordingly, in these embodiments, the second moment in time may be determined as the moment in time of receiving, by the controller 310 from the receiving unit 306, a second electrical signal generated in response to receiving an other portion of the given optical pulse from the input beam 316.

By the present technology, the controller 310 is configured to determine, based on the first moment in time and the second moment in time, a time-of-flight value and/or a phase modulation value for the emitted pulse of the output beam 314. The time-of-light value T, in a sense, a "round-trip" time for the emitted pulse to travel from the LiDAR system 300 to the object 320 and back to the LiDAR system 300. The controller 310 is thus broadly configured to determine the distance 318 in accordance with the following equation:

$$D = \frac{c \cdot T}{2}, \quad (1)$$

wherein D is the distance 318, T is the time-of-flight value, and c is the speed of light (approximately $3.0 \times 10^8$ m/s).

As previously alluded to, the LiDAR system 300 may be used to determine the distance 318 to one or more other potential objects located in the surroundings 250. By scanning the output beam 314 across the ROI 325 of the LiDAR system 300 in accordance with the predetermined scan pattern, the controller 310 is configured to map distances (similar to the distance 318) to respective data points within the ROI 325 of the LiDAR system 300. As a result, the controller 310 is generally configured to render these data points captured in succession (e.g., the point cloud) in a form of a multi-dimensional map. In some implementations, data related to the determined time of flight and/or distances to objects could be rendered in different informational formats.

As an example, this multi-dimensional map may be used by the electronic device 210 for detecting, or otherwise identifying, objects or determining a shape or distance of potential objects within the ROI 325 of the LiDAR system 300. It is contemplated that the LiDAR system 300 may be configured to repeatedly/iteratively capture and/or generate point clouds at any suitable rate for a given application.

Scanner Unit 308

With reference to FIGS. 4-9, certain embodiments of the scanner unit 308, according to the present disclosure will now be described in more detail. According to certain embodiments of the present technology, the scanner unit 308 is configured to, selectively, direct the output beam 314 so as to define different regions of interest 325 within the FOV. By means of certain embodiments, a switching between the different regions of interest 325 can thus be provided in a faster and/or more efficient manner. Furthermore, the scanner unit 308 may enable a predetermined scan pattern to be quickly and/or efficiently adapted based on one or more triggers, which will be described in further detail below.

Figure 4:
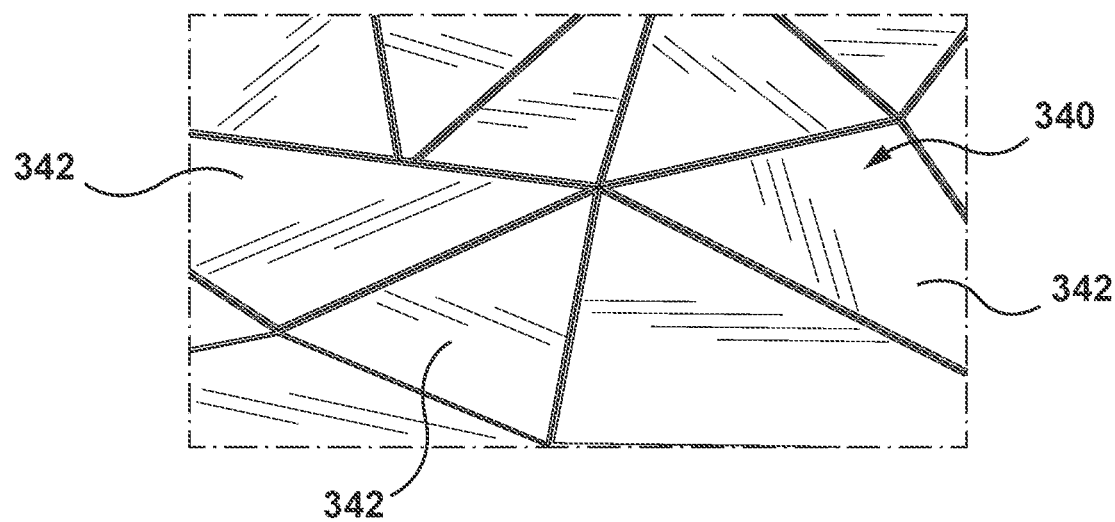
FIG. 4 depicts a plan view of a scanning face of a scanner unit of the LiDAR system of FIG. 3 in accordance with certain non-limiting embodiments of the present technology.
Figure 5:
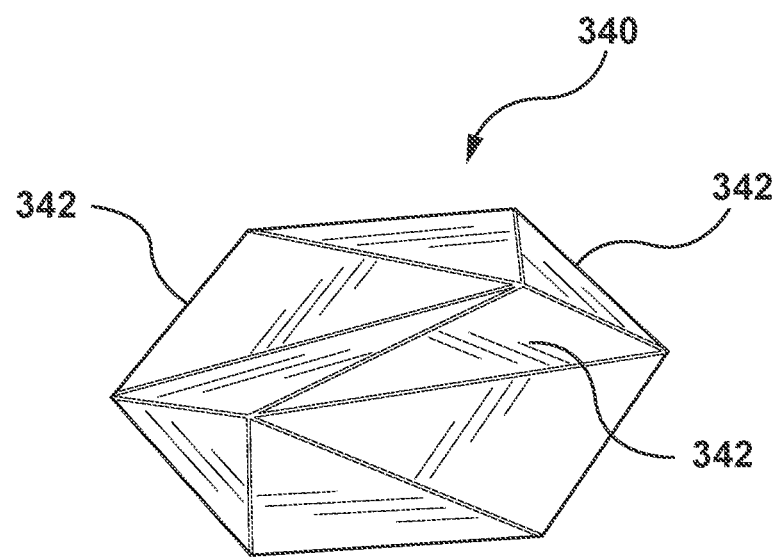
FIG. 5 depicts a plan view of a scanning face of a scanner unit of the LiDAR system of FIG. 3 in accordance with certain other non-limiting embodiments of the present technology.

In this respect, the scanner unit 308 is provided with a scanning face 340 having a plurality of reflective zones 342 (FIGS. 4 and 5). Each reflective zone 342 comprises a reflective surface 344 for receiving the output beam 314 and transmitting it as a spread beam 346 along a spread axis 348 to define a given ROI 325 within the FOV. At least some of the reflective zones 342 are configured to transmit different spread beams 346 with different spread axes 348.

Figure 6:
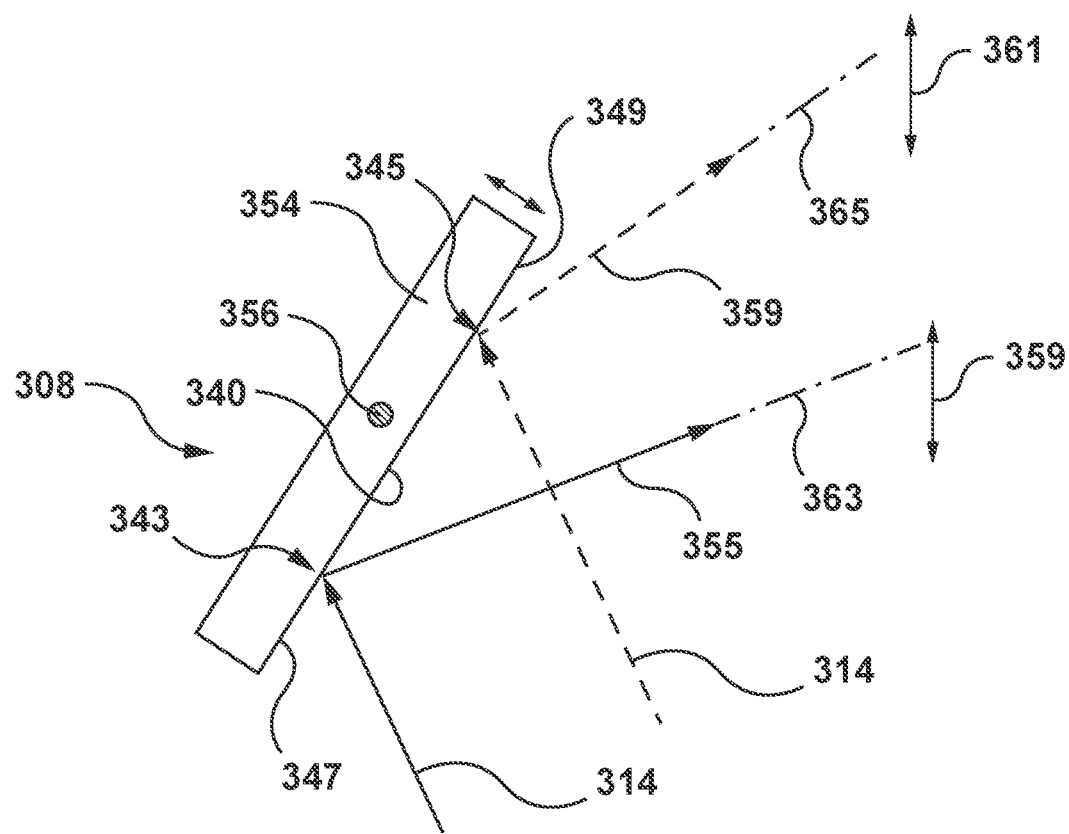
FIG. 6 depicts a side view of the scanner unit of FIG. 5 or FIG. 6 in accordance with certain other non-limiting embodiments of the present technology.

As an example, and referring to FIG. 6, there is provided, on the scanning face 340 of the scanner unit 308, a first reflective zone 343, of the reflective zones 342, having a first reflective surface 347 for receiving the output beam 314 and transmitting as a first spread beam 355 along a first spread axis 363 to define a first region of interest 359 within the FOV, and a second reflective zone 345 having a second reflective surface 349 for receiving at least a portion of the output beams 314 and transmitting as a second spread beam 357 along a second spread axis 365 to define a second region of interest 361 within the FOV. In certain embodiments, the first spread axis 348a is different than the second spread axis 365. The respective regions of interest 359, 361 defined by the respective first and second spread beams 355, 357 may be overlapping or non-overlapping.

A shape of each reflective zone 342 is not limited, and each reflective zone 342 may have any suitable shape and size according to a desired given region of interest 325. For example, in certain embodiments, at least a portion of a perimeter of one of the reflective zones 342 may have straight edges. In certain embodiments, the entire perimeter of the reflective zone 342 is straight edged and the reflective zone 342 is trapezoidal in shape. In another example, at least one reflective zone of the reflective zones 342 has at least a portion of its perimeter which is arcuate.

There may be provided any number of reflective zones 342 on a scanning face 340. In certain embodiments, there are two or more reflective zones 342 on the scanning face 340.

In certain embodiments, the scanning face 340 is non-planar. In other words, the scanning face 340 may be multi-faceted. It can be said that at least one of the pluralities of reflective surface 344 is different to another reflective surface 344 of the plurality of reflective surfaces 344.

In certain embodiments, at least one of the reflective surfaces 344 is planar. In certain embodiments, at least one of the reflective surfaces 344 is non-planar and maybe curved such as in a concave or convex manner.

Figure 7:
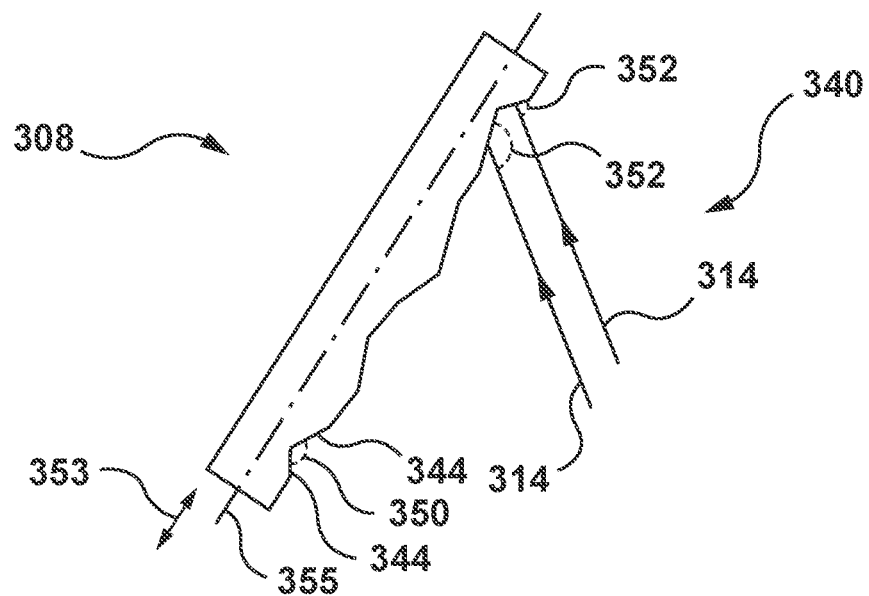
FIG. 7 depicts a side view of the scanner unit of FIG. 5 or FIG. 6 showing reflective zones of the scanning face in more detail in accordance with certain other non-limiting embodiments of the present technology.

In the embodiments in which the reflective surfaces 344 are planar, at least some of the reflective surfaces 344 may be angled with respect to each other. By angled is meant that the reflective surfaces 344 are not on the same plane. An angle 350 between the at least two reflective surfaces 344 may range between about 0.1° and about 180°, or more preferably between about between about 0° and about 90° (FIG. 7). Stated another way, each reflective surface 344 which is planar can be considered to have a reference angle with respect to a reference plane. Thus, the reflective zones 342 can be said to comprise a plurality of reflective surfaces 344, at least two of the reflective surfaces 344 having a different reference angle to each other with reference to a reference plane.

In this respect, the output beam 314 will meet the at least two reflective surfaces 342 which are angled with respect to each other at different incident angles 352 (shown in FIG. 7), thereby generating spread beams 346 with different spread axes 348.

As illustrated in FIG. 6, the scanner unit 308, in certain embodiments, is at least partially embodied as an oscillating mirror 354, such as an oscillating galvo mirror, configured to rotate about an axis of oscillation 356.

Figure 8:
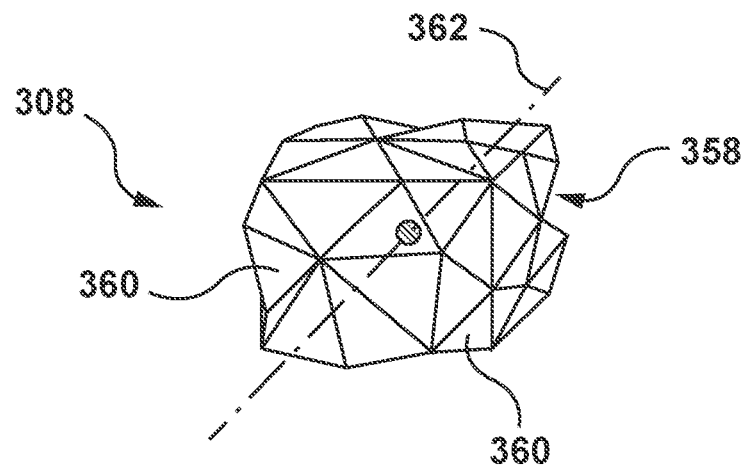
FIG. 8 depicts a side view of the scanner unit of FIG. 3 in accordance with certain other non-limiting embodiments of the present technology.

In certain embodiments, and with reference to FIG. 8, the scanner unit 308 is at least partially embodied as a prism 358 having a plurality of prism faces 360. At least one of the prism faces 360 is the scanning face 340 comprising the plurality of reflective zones 342. The prism 358 may be configured to be rotatable about an axis of rotation 362.

In certain embodiments, the scanner unit 308 is embodied as both the prism 358 and the oscillating mirror 354. The scanning face 340 therefore comprises the reflective zones 342 either from one or both of the prism 358 and the oscillating mirror 354.

In certain embodiments of any of the above embodied versions of the scanner unit 308, at least two of the reflective surfaces 344 may be made of different materials having different optical properties, or include one or more layers of different materials. For example, the different materials may adapt an optical property of the output beam 314, such as its polarization, wavelength, frequency etc. As a consequence, the resultant spread beams may have different optical properties.

In certain embodiments, the controller 310, which is communicatively coupled to the light source 302 and the scanner unit 308, is configured to cause relative movement between the output beam 314 and the scanner unit 308 for selective contact of the given output beam 314 with the given reflective zone 342 of the plurality of reflective zones 342 to emit the given output beam 314 for the desired region of interest 325.

In this respect, the controller 310 may be configured to move the scanner unit 308 or the output beam 314, or to activate different light sources directed to given reflective surfaces 344.

In the first example, the controller 310 may be configured to move the scanner unit 308 in a direction 353 parallel to an elongate plane 355 of the scanner unit 308 (FIG. 7). It will thus be understood that the output beam 314 is not moved, but the scanner unit 308 is moved to cause the given reflective surface 344 to be contacted by the output beam 314.

In the second example, a direction of the output beam 314 may be caused to change to direct the output beam 314 onto the given reflective surface 344 by moving the light source or by using optical components such as mirrors or MEMS to change a direction of the light source.

In the third example, the LiDAR system 300 may comprise a plurality of light sources, with at least some of the light sources directed to at least some of the reflective surfaces 344. It will be understood that a given light source associated with the given reflective source 344 can then be activated as needed.

Figure 9:
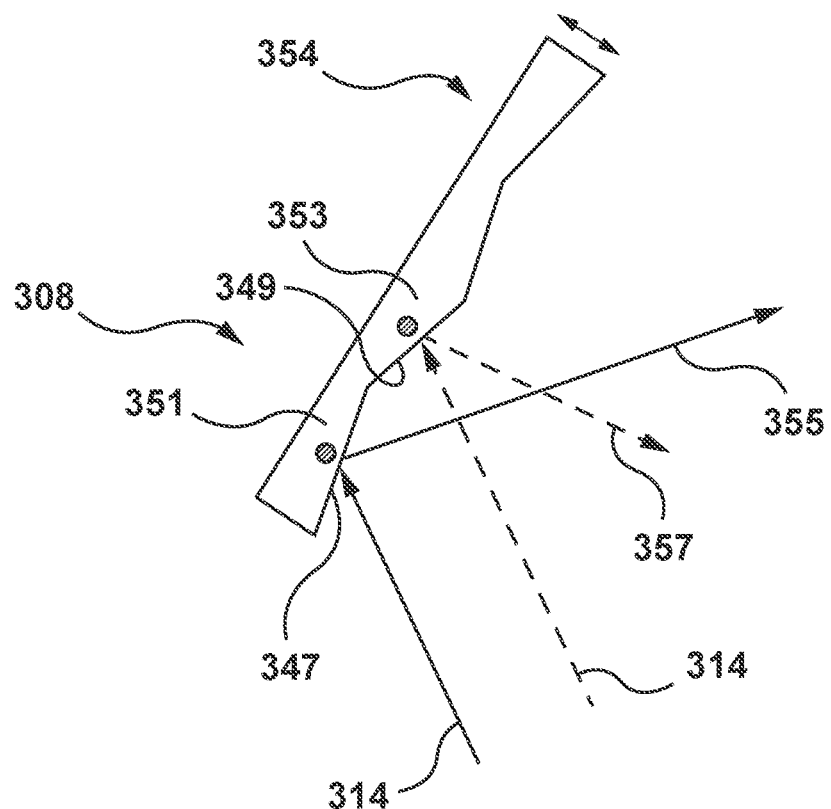
FIG. 9 depicts a side view of the scanner unit of FIG. 5 or FIG. 6 in accordance with certain other non-limiting embodiments of the present technology.

With further reference to the first example, in embodiments in which the scanner unit 308 is embodied as an oscillating mirror 354, in certain embodiments, the scanner unit 308 may be configured to selectively oscillate about different axes of oscillation. This is illustrated in FIG. 9, in which the first reflective zone 343 is shown adjacent to the second reflective zone 345, and the axis of rotation 356 is shown as being moved to a first axis of rotation 351 for the first reflective surface 347, and to a second axis of rotation 353 for the second reflective surface 349.

In certain embodiments, the first axis of rotation 351 is centrally positioned relative to the first reflective surface 347, and the second axis of rotation 353 is centrally positioned relative to the second reflective surface 349. Accordingly, in order to define the desired region of interest 325 associated with the given reflective zone 342, the controller 310 is configured to shift the axis of rotation 356 such that it is positioned substantially centrally of the given reflective zone 342. This then causes the output beam 314 to be incident on the reflective surface 344 of the given reflective zone 342.

In other embodiments, in order to cause the output beam 314 to be incident on the given reflective surface 344, the controller 310 is configured to shift the axis of rotation 356 to a predefined position on the scanning face 340. The predefined position is not necessarily adjacent to the given reflective surface. It may in fact be positioned at any place within a body of the scanner unit 308.

In certain embodiments, the shift in a position of the axis of rotation is performed using a linear actuator. However, in other embodiments, the shift in the position of the axis of rotation may be caused by any other mechanical system. The shift in the position of the axis of rotation may be modulated by the controller 310.

The controller 310 may also be configured to modulate an amplitude of the oscillation of the oscillating mirror 354. By modulation is meant changing the amplitude or maintaining the amplitude at a predetermined amplitude. In certain embodiments, the controller 310 is configured to maintain the amplitude of oscillation whilst changing a position of the axis of rotation of the controller 310.

In certain embodiments, the controller 310 may be configured to determine a sequence of reflective surfaces 344 on which to contact the output beam 314 in order to generate a predetermined scan pattern. This may be conducted, such as by the controller 310, using determined relationships between one or more parameters such as: the angle of the reflective surface 344 relative to the reference plane, the incident angle 352 on the reflective surface 344 and a reflected angle of the spread axis 348 relative to the reflective surface 344.

Turning now to the potential triggers for causing the selective contact of the output beams 314 with the given reflective zone 342, in certain embodiments, the controller 310 can be configured to cause the selective contact of the output beams 314 with the reflective zones 342 according to a predetermined schedule. The predetermined schedule may comprise one or more of a predetermined order (sequence) of contact with the reflective surfaces 344, and a predetermined time duration on each reflective surface 344.

In certain other embodiments, the trigger for causing the selective contact of the output beam 314 with the given reflective zone 342 is responsive to a determination, in any manner, that a scan of a given region of interest within the FOV is required.

In this respect, each reflective surface 344 may be associated with a given region of interest. This information may be stored in a database accessible to the controller 310, such that on determination that the scan in the given region of interest is required, the controller 310 can cause the output beam 314 to contact the associated reflective surface 344.

One such example of this scenario is on detection by the LiDAR system 300 of an unidentified object in one area of the FOV of the vehicle 220, warranting further investigation. Another such example is after an unidentified object is detected after a non-detailed scan (e.g. debris on the road). In that case, the controller 310 may determine that the region(s) of interest in which the debris is located should be scanned, and cause contact between the output beam 314 and the given reflective surface 344.

In certain other embodiments, the trigger for causing the selective contact of the output beam comprises a predetermined geographical trigger. The controller 310 may determine a presence of the predetermined geographical trigger such as GPS location, etc. For example, the predetermined geographical trigger may comprise a location of a known danger spot such as, but not limited to, a sharp turn in a road, a steep incline, a steep decline, a blind turn, a windy crossing, a school crossing, an animal crossing, a notoriously busy junction, an area with tall buildings, an area without tall buildings. The controller 310 may be configured to cause a predetermined scan based on a given predetermined geographical trigger. For example, at a school crossing, the output beam 314 may be caused to contact those reflective surfaces 344 to scan regions of interest in the FOV more pertinent to children's heights and speed of movement. In another example, when the vehicle 220 is located in an area without tall buildings, the output beam 314 may be caused to contact those reflective surfaces 344 to scan regions of interest lower down in the FOV.

In certain other embodiments, the trigger for causing the selective contact of the output beam comprises a predetermined environmental trigger. For example, on determination by a sensor of a certain environmental condition, such as heavy rain, the controller 310 may be configured to cause relative movement between the scanner unit 308 and the output beam 314 to cause the output beam 314 to be incident on a predetermined reflective surface 344 of the plurality of reflective surfaces for scanning a predetermined ROI.

The controller 310 is configured to execute a method 1000 for operating a LiDAR system, such as the LiDAR system 300, in a manner which can switch between different ROIs within the FOV, to detect objects in different parts of the surroundings of the vehicle 220, in certain embodiments.

Computer-Implemented Methods

Figure 10:
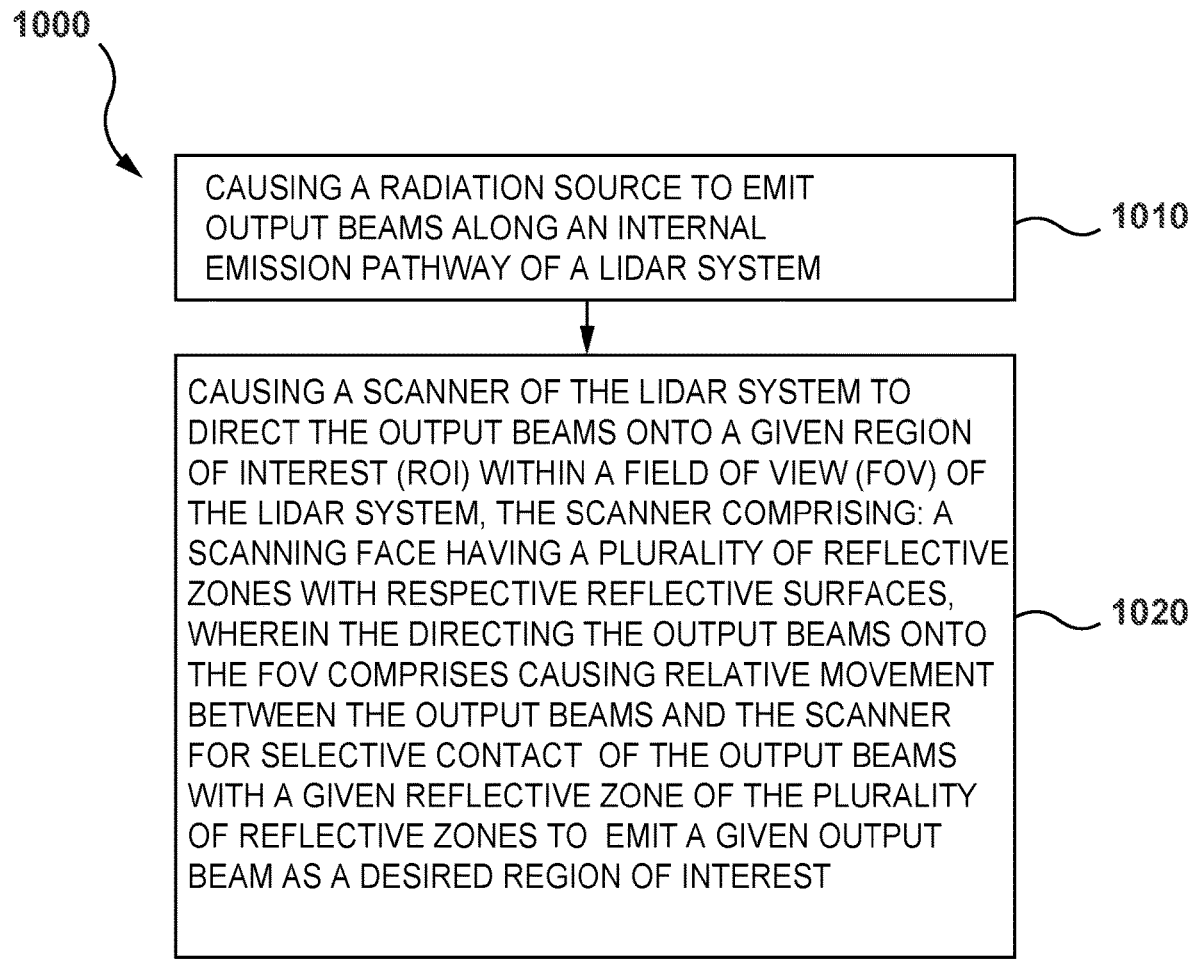
FIG. 10 depicts a schematic diagram of a method for detecting an object located in the surroundings of the vehicle present in the network computing environment of FIG. 2 based on data obtained by the LiDAR system of FIG. 3, in accordance with certain non-limiting embodiments of the present technology.

With reference now to FIG. 10, there is depicted a flowchart of the method 1000, according to the non-limiting embodiments of the present technology. The method 1000 may be executed by the controller 310.

STEP 1010: Causing a Radiation Source to Emit Output Beams Along an Internal Emission Pathway of a LIDAR System The method 1000 comprises causing a radiation source to emit output beams along an internal emission pathway of a LIDAR system. The LIDAR system may comprise an embodiment of the LiDAR system 300 and including the light source 302 and the output beam 314.

STEP 1020: Causing a Scanner of the LIDAR System to Direct the Output Beams onto a Given Region of Interest (ROI) within a Field of View (FOV) of the LIDAR System, the Scanner Comprising: A Scanning Face Having a Plurality of Reflective Zones with Respective Reflective Surfaces, Wherein the Directing the Output Beams onto the FOV Comprises Causing Relative Movement Between the Output Beams and the Scanner for Selective Contact of the Output Beams with a Given Reflective Zone of the Plurality of Reflective Zones to Emit a Given Output Beam as a Desired Region of Interest In Step 1020, the method 1000 comprises causing a scanner, such as the scanner unit 308, to direct the output beams 314 to a given reflective surface 344 in order to define a given region of interest 325. The regions of interest 325 defined by the different reflective surfaces 344 may overlap in certain embodiments. In certain other embodiments, the regions of interest 325 do not overlap. In other embodiments, some of the regions of interest 325 may be overlapping and some may not be overlapping.

In certain embodiments, the scanner unit 308 comprises the scanning face 340 having the plurality of reflective zones 342 with respective reflective surfaces 344, the plurality of reflective zones comprising: the first reflective zone 343 having the first reflective surface 347 for receiving at least a portion of the output beams 314 and transmitting as the first spread beam 355 along the first spread axis 348*a* to define the first region of interest 325*a*, and the second reflective zone 345 having the second reflective surface 349 for receiving at least a portion of the output beams 314 and transmitting as the second spread beam 357 along the second spread axis 365 to define the second region of interest 361 within the FOV. The first spread axis 363 is different than the second spread axis 348*b*. wherein the directing the output beams onto the FOV comprises causing relative movement between the output beams and the scanner for selective contact of the output beams with a given reflective zone of the plurality of reflective zones to emit a given output beam as a desired region of interest.

In certain embodiments, the controller 310 is configured to cause relative movement between the output beams 314 and the scanner unit 308 for selective contact of the output beams 314 with the given reflective zone 342 of the plurality of reflective zones 342 according to one or more of (a) a predetermined schedule, (b) responsive to a determination from a sensor signal that a scan of a given region of interest within the FOV is required, (c) responsive to a geographical trigger, and (d) responsive to an environmental trigger.

In certain embodiments, causing the relative movement comprises the controller 310 causing the scanner unit 308 to move in a direction parallel to an elongate plane of the scanner unit 308.

In certain other embodiments, causing the relative movement comprises the controller 310 causing a direction of travel of the output beam 314 to change.

In certain other embodiments, causing the relative movement comprises causing the scanner unit 308 to selectively oscillate about different axes of oscillation, optionally whilst modulating an amplitude of the oscillation.

Clauses

CLAUSE 1. A LIDAR system for detecting objects in a surrounding environment of an autonomous vehicle, the LIDAR system comprising: a radiation source configured to emit output beams along an internal emission pathway; a scanner positionable along the internal emission pathway and configured to direct the output beams onto a field of view (FOV) within the surrounding environment, wherein the scanner comprises: a scanning face having a plurality of reflective zones with respective reflective surfaces, the plurality of reflective zones comprising at least: a first zone having a first reflective surface for receiving at least a portion of the output beams and transmitting as a first spread beam along a first spread axis to define a first region of interest (ROI) within the FOV, and a second zone having second reflective surface for receiving at least a portion of the output beams and transmitting as a second spread beam along a second spread axis to define a second ROI within the FOV, the first spread axis being different than the second spread axis; and a controller communicatively coupled to the radiation source and the scanner, the controller being configured to cause relative movement between the output beams and the scanner for selective contact of the output beams with a given reflective zone of the plurality of reflective zones to emit a given output beam as a desired region of interest.

CLAUSE 2. The LIDAR system of clause 1, wherein the controller is configured to move the scanner in a direction parallel to an elongate plane of the scanning body for selective contact of the output beams with the given reflective zone of the plurality of reflective zones.

CLAUSE 3. The LIDAR system of clause 1, wherein the controller is configured to move the output beams for selective contact of the output beams with the given reflective zone of the plurality of reflective zones.

CLAUSE 4. The LIDAR system of clause 1, wherein the controller is configured to cause the scanner to selectively oscillate about different axes of oscillation in order to cause selective contact of the output beams with different reflective zones of the plurality of reflective zones.

CLAUSE 5. The LIDAR system of any one of clauses 1-4, wherein the scanner is an oscillating mirror and configured to oscillate about an axis of oscillation.

CLAUSE 6. The LIDAR system of any one of clauses 1-5, wherein the controller is configured to modulate an amplitude of the oscillation of the oscillating mirror.

CLAUSE 7. The LIDAR system of clause 1, wherein the scanner is an oscillating mirror and configured to selectively oscillate about different axes of oscillation, the different axes of oscillation comprising at least: a first axis of oscillation which has a first position relative to the first reflective surface and a second axis of oscillation which has a second position relative to the second reflective surface.

CLAUSE 8. The LIDAR system of clause 7, wherein the first position is centered with respect to the first reflective surface.

CLAUSE 9. The LIDAR system of clause 7 or clause 8, wherein the controller is configured to maintain an oscillation of the oscillating mirror while causing the oscillating mirror to oscillate about different axes of oscillation.

CLAUSE 10. The LIDAR system of any one of clauses 1-9, wherein the scanning face is non-planar, and the first reflective surface and the second reflective surface are angularly off-set from one another.

CLAUSE 11. The LIDAR system of any one of clauses 1-10, wherein the first reflective surface and the second reflective surface are made of different materials to impart different optical properties on the first spread beam and the second spread beam.

CLAUSE 12. The LIDAR system of any one of clauses 1-11, wherein the scanner is a rotating prism having a plurality of faces, and at least one of the faces of the rotating prism comprising the scanning face having the plurality of reflective zones with respective reflective surfaces.

CLAUSE 13. The LIDAR system of any of clauses 1-12, wherein at least one of the reflective surfaces includes a material configured to modulate an optical property of the output beam incident on the at least one reflective surface.

CLAUSE 14. The LIDAR system of any of clauses 1-13, wherein the scanner is an oscillating galvo mirror having at least one face, and the at least one face of the oscillating galvo mirror comprises the scanning face having the plurality of reflective zones with respective reflective surfaces.

CLAUSE 15. The LIDAR system of any one of clauses 1-14, further comprising a receiver for receiving reflected output beams from the region of interest.

CLAUSE 16. A method for detecting objects in a surrounding environment of an autonomous vehicle, the method executable by a controller which is communicatively coupled to a radiation source and a scanner of a LIDAR system, the method comprising: causing the radiation source to emit output beams along an internal emission pathway of the LIDAR system; causing the scanner to direct the output beams onto a field of view (FOV) within the surrounding environment, the scanner comprising: a scanning face having a plurality of reflective zones with respective reflective surfaces, the plurality of reflective zones comprising at least: a first zone having a first reflective surface for receiving at least a portion of the output beams and transmitting as a first spread beam along a first spread axis to define a first region of interest (ROI) within the FOV, and a second zone having second reflective surface for receiving at least a portion of the output beams and transmitting as a second spread beam along a second spread axis to define a second ROI within the FOV, the first spread axis being different than the second spread axis; and wherein the directing the output beams onto the FOV comprises causing relative movement between the output beams and the scanner for selective contact of the output beams with a given reflective zone of the plurality of reflective zones to emit a given output beam as a desired region of interest.

CLAUSE 17. The method of clause 16, wherein the controller is configured to cause relative movement between the output beams and the scanner for selective contact of the output beams with a given reflective zone of the plurality of reflective zones according to one or more of (a) a predetermined schedule, (b) responsive to a determination from a sensor signal that a scan of a given region of interest within the FOV is required, (c) responsive to a geographical trigger, and (d) responsive to an environmental trigger.

CLAUSE 18. The method of clause 16 or clause 17, wherein causing the relative movement comprises the controller causing the scanner to move in a direction to parallel to an elongate plane of the scanner.

CLAUSE 19. The method of clause 16 or clause 17, wherein causing the relative movement comprises the controller causing a direction of travel of the output beam to change.

CLAUSE 20. The method of clause 16 or clause 17, wherein causing the relative movement comprises causing the scanner to selectively oscillate about different axes of oscillation, whilst modulating an amplitude of the oscillation.

The invention claimed is:

1. A LIDAR system for detecting objects in a surrounding environment of an autonomous vehicle, the LIDAR system comprising:
    a radiation source configured to emit output beams along an internal emission pathway;
    a scanner positionable along the internal emission pathway and configured to direct the output beams onto a field of view (FOV) within the surrounding environment, wherein the scanner comprises:
        a scanning face having a plurality of reflective zones with respective reflective surfaces, the plurality of reflective zones comprising at least:
            a first zone having a first reflective surface for receiving at least a portion of the output beams and transmitting as a first spread beam along a first spread axis to define a first region of interest (ROI) within the FOV, and
            a second zone having second reflective surface for receiving at least a portion of the output beams and transmitting as a second spread beam along a second spread axis to define a second ROI within the FOV, the first spread axis being different than the second spread axis; and
        a controller communicatively coupled to the radiation source and the scanner, the controller being configured to cause the scanner to selectively oscillate about different axes of oscillation in order to cause selective contact of the output beams with different reflective zones of the plurality of reflective zones to emit different output beams as a desired region of interest.

2. The LIDAR system of claim 1, wherein the controller is configured to move the scanner in a direction parallel to an elongate plane of a scanning body for selective contact of the output beams with the given reflective zone of the plurality of reflective zones.

3. The LIDAR system of claim 1, wherein the controller is configured to move the output beams for selective contact of the output beams with the given reflective zone of the plurality of reflective zones.

4. The LIDAR system of claim 1, wherein the scanner is an oscillating mirror and configured to oscillate about an axis of oscillation.

5. The LIDAR system of claim 4, wherein the controller is configured to modulate an amplitude of the oscillation of the oscillating mirror.

6. The LIDAR system of claim 1, wherein the scanner is an oscillating mirror and configured to selectively oscillate about different axes of oscillation, the different axes of oscillation comprising at least: a first axis of oscillation which has a first position relative to the first reflective surface and a second axis of oscillation which has a second position relative to the second reflective surface.

7. The LIDAR system of claim 6, wherein the first position is centered with respect to the first reflective surface.

8. The LIDAR system of claim 6, wherein the controller is configured to maintain an oscillation of the oscillating mirror while causing the oscillating mirror to oscillate about different axes of oscillation.

9. The LIDAR system of claim 1, wherein the scanning face is non-planar, and the first reflective surface and the second reflective surface are angularly off-set from one another.

10. The LIDAR system of claim 1, wherein the first reflective surface and the second reflective surface are made of different materials to impart different optical properties on the first spread beam and the second spread beam.

11. The LIDAR system of claim 1, wherein the scanner is a rotating prism having a plurality of faces, and at least one of the faces of the rotating prism comprising the scanning face having the plurality of reflective zones with respective reflective surfaces.

12. The LIDAR system of claim 1, wherein at least one of the reflective surfaces includes a material configured to modulate an optical property of the output beam incident on the at least one reflective surface.

13. The LIDAR system of claim 1, wherein the scanner is an oscillating galvo mirror having at least one face, and the at least one face of the oscillating galvo mirror comprises the scanning face having the plurality of reflective zones with respective reflective surfaces.

14. The LIDAR system of claim 1, further comprising a receiver for receiving reflected output beams from the region of interest.

15. A method for detecting objects in a surrounding environment of an autonomous vehicle, the method executable by a controller which is communicatively coupled to a radiation source and a scanner of a LIDAR system, the method comprising:
    causing the radiation source to emit output beams along an internal emission pathway of the LIDAR system;
    causing the scanner to direct the output beams onto a field of view (FOV) within the surrounding environment, the scanner comprising:
        a scanning face having a plurality of reflective zones with respective reflective surfaces, the plurality of reflective zones comprising at least:
            a first zone having a first reflective surface for receiving at least a portion of the output beams and transmitting as a first spread beam along a first spread axis to define a first region of interest (ROI) within the FOV, and
            a second zone having second reflective surface for receiving at least a portion of the output beams and transmitting as a second spread beam along a second spread axis to define a second ROI within the FOV, the first spread axis being different than the second spread axis; and
        wherein the directing the output beams onto the FOV comprises causing the scanner to selectively oscillate about different axes of oscillation in order to cause selective contact of the output beams with different reflective zones of the plurality of reflective zones to emit different output beams as a desired region of interest.

16. The method of claim 15, wherein the controller is configured to cause relative movement between the output beams and the scanner for selective contact of the output beams with a given reflective zone of the plurality of reflective zones according to one or more of (a) a predetermined schedule, (b) responsive to a determination from a sensor signal that a scan of a given region of interest within the FOV is required, (c) responsive to a geographical trigger, and (d) responsive to an environmental trigger.

17. The method of claim 15, wherein causing the relative movement comprises the controller causing the scanner to move in a direction parallel to an elongate plane of the scanner.

18. The method of claim 15, wherein causing the relative movement comprises the controller causing a direction of travel of the output beam to change.

19. The method of claim 15, wherein causing the relative movement comprises causing the scanner to selectively oscillate about different axes of oscillation, whilst modulating an amplitude of the oscillation.

* * * * *